(12) United States Patent
Juarez et al.

(10) Patent No.: US 12,104,976 B1
(45) Date of Patent: Oct. 1, 2024

(54) METHODS AND SYSTEMS FOR DIAGNOSING TRANSMISSION WARM-UP VALVE

(71) Applicant: Ford Global Technologies, LLC, Dearborn, MI (US)

(72) Inventors: Luis Juarez, Northville, MI (US); Adam Krach, Canton, MI (US); Vaibhav Khanna, Canton, MI (US); Michael Joseph Giunta, Livonia, MI (US); Peter Turpel, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/505,459

(22) Filed: Nov. 9, 2023

(51) Int. Cl.
| | |
|---|---|
| *B60W 10/10* | (2012.01) |
| *B60W 10/06* | (2006.01) |
| *B60W 50/02* | (2012.01) |
| *F02D 13/02* | (2006.01) |
| *F16H 57/04* | (2010.01) |
| *F16H 59/36* | (2006.01) |
| *F16H 59/72* | (2006.01) |
| *F16H 59/78* | (2006.01) |
| *F16H 61/12* | (2010.01) |
| *G01M 13/02* | (2019.01) |

(52) U.S. Cl.
CPC ............ *G01M 13/02* (2013.01); *B60W 10/06* (2013.01); *B60W 10/10* (2013.01); *B60W 50/0205* (2013.01); *F02D 13/02* (2013.01); *F16H 57/0415* (2013.01); *F16H 59/36* (2013.01); *F16H 59/72* (2013.01); *F16H 59/78* (2013.01); *F16H 61/12* (2013.01); *F16H 2059/366* (2013.01); *F16H 2061/1208* (2013.01); *F16H 2061/1256* (2013.01)

(58) Field of Classification Search
CPC .. B60W 10/06; B60W 10/10; B60W 50/0205; B60W 2510/0638; B60W 2510/107; B60W 2510/0676; F16H 57/0415; F16H 59/36; F16H 59/72; F16H 59/78; F16H 61/12; F16H 2059/366; F16H 2061/1208; F16H 2061/1256; F02D 13/02; G01M 13/02
USPC ...................................... 701/53, 54
See application file for complete search history.

(56) References Cited

U.S. PATENT DOCUMENTS

| | | | |
|---|---|---|---|
| 5,319,963 A * | 6/1994 | Benford | F16H 59/72 374/141 |
| 8,197,131 B2 * | 6/2012 | Kitajima | F16H 61/12 702/182 |
| 9,217,689 B2 | 12/2015 | Rollinger et al. | |

(Continued)

OTHER PUBLICATIONS

DE 102021202411A1; Schmid et al; English translation of DE102021202411A1; May 1, 2024 (Year: 2024).*

(Continued)

*Primary Examiner* — Roger L Pang
(74) *Attorney, Agent, or Firm* — Vincent Mastrogiacomo; McCoy Russell LLP

(57) ABSTRACT

Systems and methods for diagnosing operation of a transmission warm-up valve are presented. In one example, the transmission warm-up valve is commanded to an open position and an estimated transmission fluid temperature is compared to an actual transmission fluid temperature to determine whether or not the transmission warm-up valve is operating as commanded.

20 Claims, 10 Drawing Sheets

(56) References Cited

U.S. PATENT DOCUMENTS

| | | |
|---|---|---|
| 9,324,199 B2 * | 4/2016 | Pursifull .............. G07C 5/0808 |
| 10,161,501 B2 | 12/2018 | Gonze et al. |
| 11,111,999 B2 * | 9/2021 | Shultz ................... B60W 10/18 |
| 2011/0098896 A1 * | 4/2011 | Kato ....................... F16H 59/72 |
| | | 701/60 |
| 2018/0128145 A1 | 5/2018 | Uhrich et al. |
| 2022/0099178 A1 * | 3/2022 | Maurer ................. B60W 10/06 |

OTHER PUBLICATIONS

Juarez, L. et al., "Methods and Systems for Diagnosing Transmission Warm-Up Valve," U.S. Appl. No. 18/505,459, filed Nov. 9, 2023, 77 pages.

* cited by examiner

METHODS AND SYSTEMS FOR DIAGNOSING TRANSMISSION WARM-UP VALVE

TECHNICAL FIELD

The present description relates to a system and methods for warming an automatic transmission of a vehicle. The methods may be particularly useful for an automatic transmission that is coupled to an engine.

BACKGROUND AND SUMMARY

At lower temperatures, viscosities of fluids in an engine and in a transmission may be greater than when the engine and transmission are warm. The higher viscosities may lead to the engine operating at a higher load and less efficiently. Therefore, it may be desirable to warm engine oil and transmission fluid so that the engine may operate more efficiently as soon as possible after starting. However, if a temperature of transmission fluid does not increase as fast as desired, engine emissions may increase and engine efficiency may be reduced. Therefore, it may be desirable to provide a way of determining whether or not subsystem components related to warming of transmission fluid are operational.

The inventors herein have recognized that it may be desirable to diagnose operation of a device that controls transmission fluid temperature and have developed a method for diagnosing operation of a transmission warm-up valve, comprising: via a controller, estimating a temperature of transmission fluid exiting a heat exchanger; and adjusting operation of a device in response to a difference between the temperature and an actual temperature of transmission fluid exiting the heat exchanger via the controller.

By estimating a temperature of transmission fluid exiting a heat exchanger and adjusting a device in response a difference between the temperature and an actual temperature of transmission fluid exiting the heat exchanger, it may be possible to diagnose operation of an automatic transmission warm-up valve. For example, if the estimated temperature is greater than the actual temperature by more than a predetermined amount, a display may be adjusted to indicate degradation of the automatic transmission warm-up valve. Additionally, operation of an engine and/or transmission may be adjusted in response to indication of automatic transmission warm-up valve degradation.

The present description may provide several advantages. Specifically, the approach may provide an indication of valve degradation that may be indicative of an increase in vehicle emissions. In addition, the approach may provide compensation for engine and/or transmission operation if valve degradation is indicated. Further, the approach may provide an indication of valve operation without having to directly monitor the valve via a dedicated sensor, thereby reducing system financial expense.

The above advantages and other advantages, and features of the present description will be readily apparent from the following Detailed Description when taken alone or in connection with the accompanying drawings. The term "driver" may be referred to throughout this specification and it refers to a human driver or human vehicle operator that is the authorized operator of the vehicle unless otherwise indicated.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
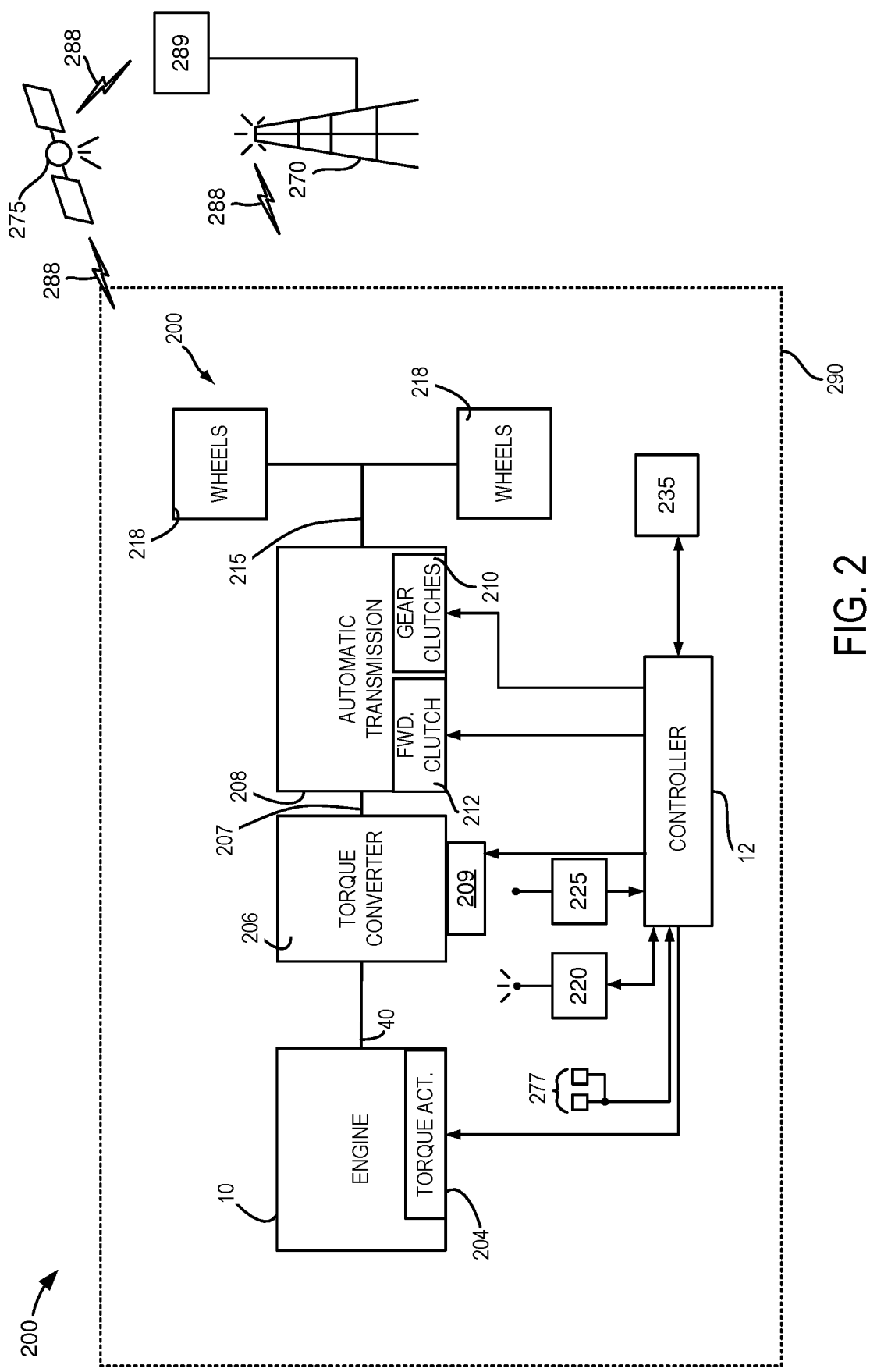
FIG. 2 shows an example vehicle driveline.
Figure 3:
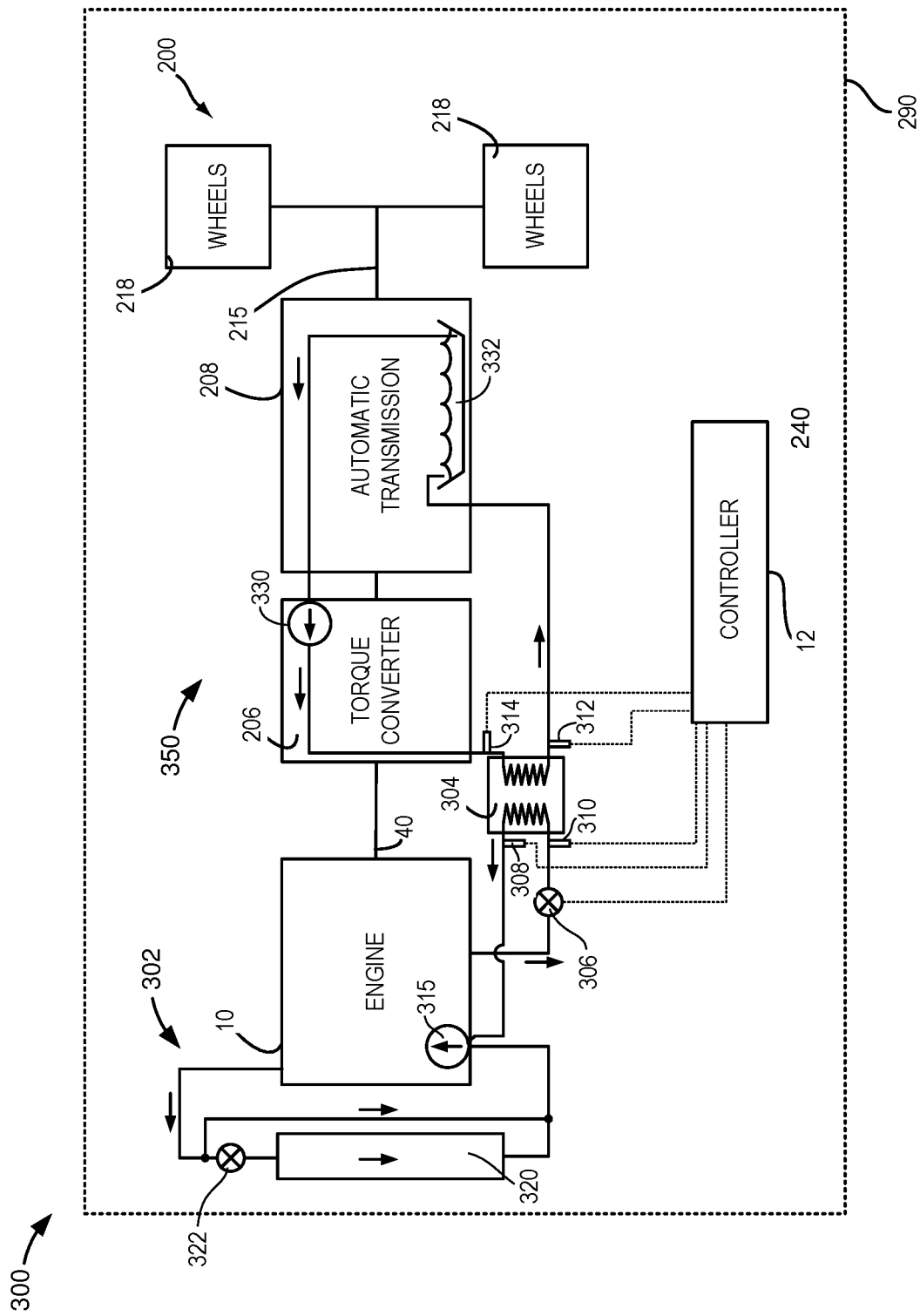
FIG. 3 shows an example heat transfer system for a vehicle.

The present description is related to diagnosing operation of an automatic transmission warm-up valve. The automatic transmission warm-up valve may control warm engine coolant flow into a heat exchanger that may transfer heat from the warm engine coolant to transmission fluid, thereby heating the transmission fluid. The automatic transmission warm-up valve may be opened shortly after a cold engine start to warm transmission fluid. The automatic transmission warm-up valve may be supplied with engine coolant from an engine of the type shown in FIG. 1. The engine may be part of a powertrain or driveline as shown in FIG. 2. The vehicle may have a heat transfer system as shown in FIG. 3. The vehicle and heat transfer system may operate according to the method shown in the block diagrams of FIGS. 4-9. The vehicle may operate according to the method of FIGS. 4-9 as shown in FIG. 10.

Figure 1:
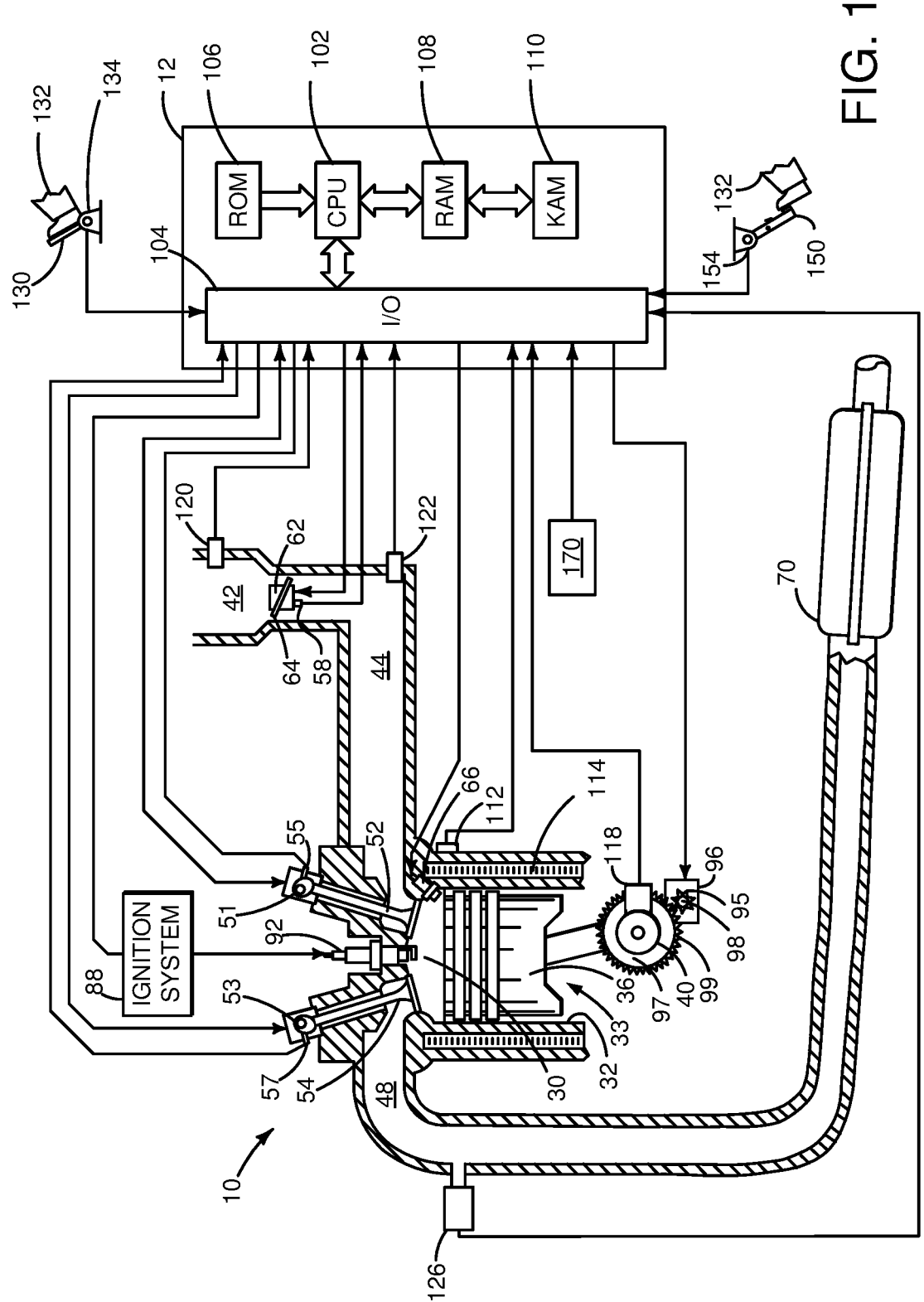
FIG. 1 is a schematic diagram of an engine.

Referring to FIG. 1, engine 10 is an internal combustion engine that comprises a plurality of cylinders, one cylinder 33 of which is shown in FIG. 1. Engine 10 is controlled by electronic engine controller 12. The controller receives signals from the various sensors of FIG. 1 and it employs the various actuators of FIG. 1 to adjust engine operation based on the received signals and instructions stored in memory of controller 12. For example, fuel injection timing, spark timing, and poppet valve operation may be adjusted responsive to engine position as determined from output of an engine position sensor.

Engine 10 includes combustion chamber 30, cylinder 33, and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a chain for example. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 33, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing force applied by human driver 132; a measurement of engine manifold absolute pressure (MAP) from pressure sensor 122 coupled to intake manifold 44; an engine position sensor from engine position sensor 118 sensing crankshaft 40 position; a measurement of air mass entering the engine from sensor 120; pedal position from pedal position sensor 154 when human driver 132 applies pedal 150 to slow the vehicle; and a measurement of throttle position from sensor 58. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

Controller 12 may receive input from human/machine interface 170. In one example, human/machine interface 170 may be a touch screen display. In other examples, human/machine interface 170 may be a key board, pushbutton, or other known interface. Controller 12 may also display information and data to human/machine interface 170.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, is a block diagram 200 of a vehicle 290 including a powertrain or driveline 200. The powertrain of FIG. 2 includes engine 10 shown in FIG. 1. It may be noted that this example shows a single controller. However, in other examples, the functions and operations performed via controller 12 may be distributed between a plurality of controllers.

Engine crankshaft 40 may be coupled to torque converter 206, and torque converter 206 is mechanically coupled to automatic transmission 208 via transmission input shaft 207. Torque converter 206 may also include a torque converter clutch 209. Automatic transmission 208 includes gear clutches (e.g., gears 1-10) 210 and forward clutch 212. Automatic transmission 208 is a fixed step ratio transmission. The gear clutches 210 and the forward clutch 212 may be selectively engaged to change a ratio of an actual total number of turns of input shaft 207 to an actual total number of turns of wheels 218. Gear clutches 210 may be engaged or disengaged via adjusting fluid supplied to the clutches via shift control solenoid valves (not shown). Torque output from the automatic transmission 208 may also be relayed to wheels 218 to propel the vehicle via output shaft 215. Specifically, automatic transmission 208 may transfer an input driving torque at the input shaft 207 responsive to a vehicle traveling condition before transmitting an output driving torque to the wheels 218. Controller 12 may selectively activate a torque converter clutch 209, gear clutches 210, and forward clutch 212. Controller 12 may also selectively deactivate or disengages a torque converter clutch 209, gear clutches 210, and forward clutch 212.

In response to a request to increase a speed of vehicle 290, controller 12 may obtain a driver demand torque or power request from a driver demand pedal or other device. Controller 12 commands engine 10 to provide the requested torque via one or more torque actuators 204. The torque converter clutch 209 may be locked and gears may be engaged via gear clutches 210 in response to shift schedules and torque converter clutch lockup schedules that may be based on transmission input shaft torque and vehicle speed.

Engine torque may be controlled by controller 12 adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Controller 12 may receive transmission input shaft position via a position sensor (not shown) and convert transmission input shaft position into input shaft speed via differentiating a signal from the position sensor. Controller 12 may receive transmission output shaft torque from a torque sensor (not shown). Controller 12 may also receive addition transmission information from sensors 277, which may include but are not limited to pump output line pressure sensors, transmission hydraulic pressure sensors (e.g., gear clutch fluid pressure sensors), driver present detection switch, driver's door switch, heart beat sensors, and ambient temperature sensors.

In some examples, controller 12 may communicate with and exchange data with navigation system 235 (e.g., a second controller). Navigation system 235 may determine a position and speed of vehicle 290 via data received from global positioning satellites (not shown). Navigation system 235 may also receive input via voice commands or via human/machine interface to determine a vehicle destination. Navigation system 235 may select a travel route based on the vehicle's present position and the vehicle's destination. Navigation system 235 may determine the travel route based on maps that may be stored within navigation system 235. Maps stored in navigation system 235 may include locations of traffic signs, fueling stations, and other points of interest. In addition, navigation system 235 may predict when a vehicle speed increase is expected based on the vehicle's present position and mapping data (e.g., road grade, travel route elevation, stored traffic signal or sign locations, etc.). Navigation system 235 may inform controller 12 of upcoming or predicted times and/or travel route locations where an increase in vehicle speed is predicted.

Controller 12 may communicate with satellite 275 via transceiver 220. Alternatively, transceiver 220 may be a transmitter-receiver. Controller 12 may receive input (e.g., data including locations and/or times when vehicle speed is predicted to increase and/or decrease) from or broadcast vehicle data to satellite 275 via transceiver 220. Controller 12 may also communicate with network 270 (e.g., cellular, vehicle to vehicle, vehicle to infrastructure networks) via transceiver 225. Alternatively, transceiver 225 may be a transmitter-receiver. Controller 12 may broadcast vehicle data to and receive input from network 270 via transceiver 225. Network 270 and/or satellite 275 may communicate with cloud computer 289 (e.g., a remote server). Cloud computer (e.g., a second controller) may communicate times and/or locations where vehicle speed may be expected to increase or decrease based on the vehicle's present position, road grade, traffic information (e.g., traffic jams, accident locations, etc.), and prior human driver behavior to controller 12 via satellite 275 and network 270 via radio or microwave frequencies 288.

Thus, the system of FIGS. 1 and 2 provides for a system for operating a vehicle, comprising: a vehicle including an internal combustion engine and a pedal; and a controller including executable instructions stored in non-transitory memory that cause the controller to inhibit automatic stopping of the internal combustion engine in response to predicted conditions that indicate an operator change of mind during a look ahead window. In a first example, the system further comprises additional instructions to not inhibit automatic stopping of the internal combustion engine in response to the predicted conditions that indicate the operator change of mind during a look ahead window. In a second example that may include the first example, the system includes where the look ahead window is a future time period, and where the look ahead window begins at a present time, or where the look ahead window begins at a time or vehicle location when a driver input to slow the vehicle is applied. In a third example that may include one or more of the first and second examples, the system includes where the look ahead window is a distance in a travel path of the vehicle and further comprises adjusting the distance in response to one or more of a rate of vehicle speed reduction, a location of a traffic sign or signal, or a location of a road profile and/or attribute change. In a fourth example that may include one or more of the first through third examples, the system further comprises additional instructions to predict conditions that indicate the operator change of mind during the look ahead window. In a fifth example that may include one or more of the first through fourth examples, the system includes where the predicted conditions include an increase of vehicle speed. In a sixth example that may include one or more of the first through fifth examples, the system further comprises additional instructions to receive the predicted conditions that indicate the operator change of mind during the look ahead window from a second controller.

Referring now to FIG. 3, a heat transfer system 300 is shown. In this example, heat transfer system 300 includes an engine coolant loop 302 and a transmission fluid loop 350. The engine coolant loop 302 includes engine 10, radiator 320, thermostat 322, engine coolant pump 315, automatic transmission warm-up valve 306, and heat exchanger 304. Transmission fluid loop 350 includes transmission 208, transmission fluid pump 330, torque converter 206, heat exchanger 304, and sump 332. The direction of flow through engine coolant loop 302 and transmission fluid loop 350 is indicated by arrows.

The heat transfer system includes a coolant heat exchanger inlet temperature sensor 310, a coolant heat exchanger outlet sensor 308, a transmission fluid heat exchanger inlet temperature sensor 314, and a transmission fluid heat exchanger outlet temperature sensor 312 for sensing coolant and transmission fluid temperatures at heat exchanger 304. Coolant heat exchanger inlet temperature sensor 310 senses a temperature of coolant entering heat exchanger 304. Coolant heat exchanger outlet temperature sensor 308 senses a temperature of coolant exiting heat exchanger 304. Transmission fluid heat exchanger inlet temperature sensor 314 senses a temperature of transmission fluid entering heat exchanger 304. Transmission fluid heat exchanger outlet temperature sensor 312 senses a temperature of transmission fluid exiting heat exchanger 304.

The heat transfer system 300 may supply warm engine coolant to heat exchanger 304 via opening automatic transmission warm-up valve 306. The warm coolant may transfer thermal energy to transmission fluid that is circulated through heat exchanger 304. Controller 12 may open and close automatic transmission warm-up valve 306 in response to temperatures sensed via temperature sensors 308-314 and other vehicle operating conditions.

The system of FIGS. 1-3 provides for a transmission warming system, comprising: an internal combustion engine; an automatic transmission; a heat exchanger; an automatic transmission warm-up valve; and a controller including executable instructions stored in non-transitory memory that cause the controller to generate a comparison of an estimate of a temperature of transmission fluid exiting the heat exchanger to an actual temperature of transmission fluid exiting the heat exchanger, and adjust operation of the automatic transmission or the internal combustion engine in response to the comparison. In a first example, the system includes where the estimate of the temperature of the transmission fluid is based on a commanded state of the automatic transmission warm-up valve. In a second example that may include the first example, the system includes where the estimate of the temperature of the transmission fluid is also based on a specific heat acceptance value of the heat exchanger. In a third example that may include one or both of the first and second examples, the system includes where the estimate of the temperature of the transmission fluid is further based on engine coolant temperature. In a fourth example that may include one or more of the first through third examples, the system includes where the estimate of the temperature of the transmission fluid is further based on engine speed. In a fifth example that may include one or more of the first through fourth examples, the system includes where adjusting operating of the transmission includes modifying a transmission shift schedule. In a sixth example that may include one or more of the first through fifth examples, the system includes where adjusting operation of the engine includes adjusting engine valve timing.

Referring now to FIGS. 4-9, block diagrams for estimating a transmission fluid temperature and diagnosing operation of the automatic transmission warm-up valve are shown. The method described by the block diagrams of FIGS. 4-9 may be incorporated into one or more controllers (e.g., 12 of FIG. 1) as executable instructions stored in non-transitory memory (e.g., read-exclusive memory). The executable instructions may cooperate with the system of FIGS. 1-3 to retrieve information or data from sensors and adjust positions of actuators in the real-world. The arrows in FIGS. 4-9 represent the direction of data flow in the block diagrams.

Block diagram 400 shows signals and blocks that operate to provide an indication or absence of automatic transmission warm-up (ATWU) valve degradation according to an estimated transmission fluid temperature and an actual valve of the transmission fluid temperature.

Figure 5:
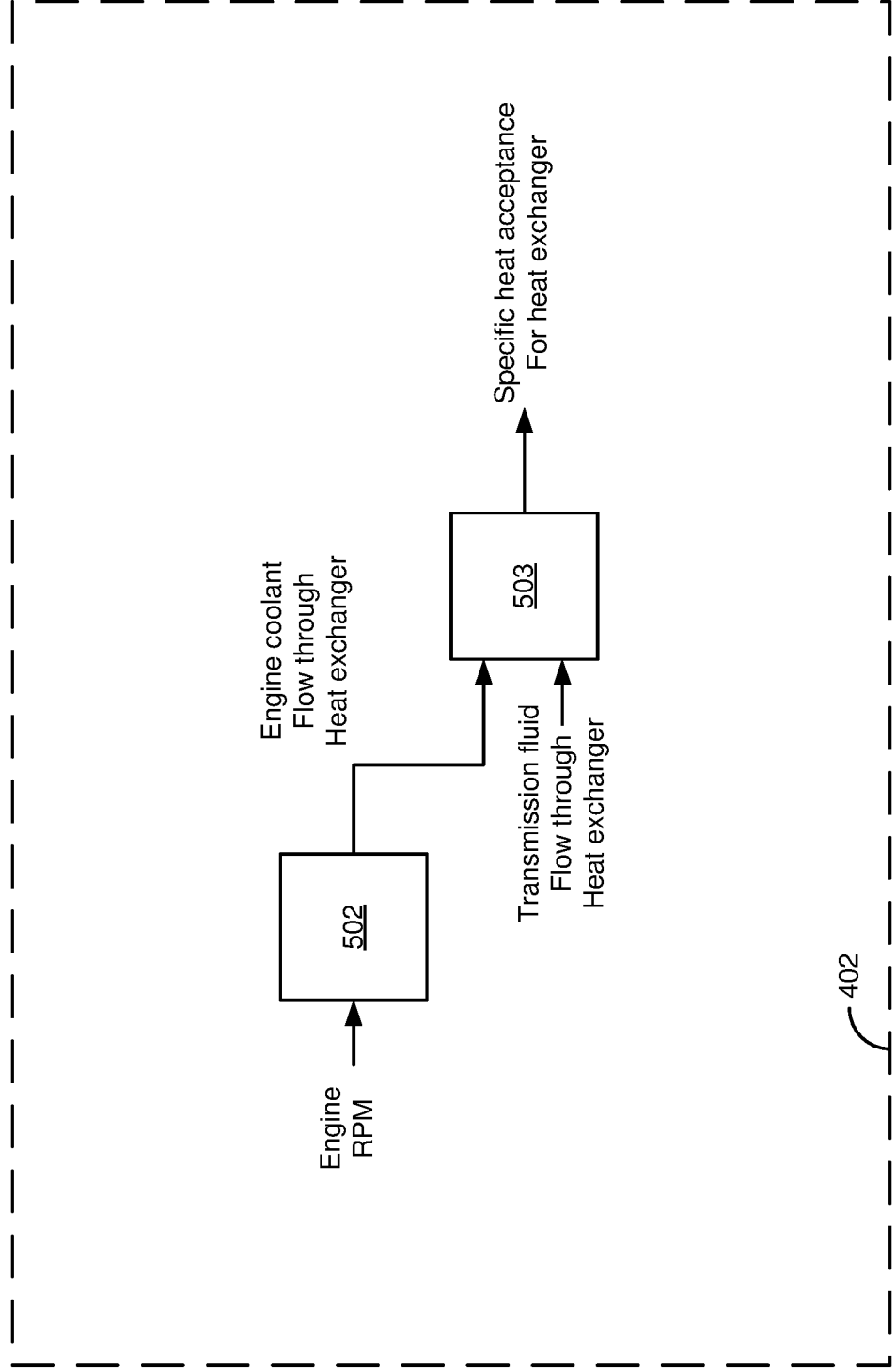

At block 402, engine speed (RPM) and transmission fluid flow rate are received as inputs to block 402. The inputs are applied to reference tables or functions as shown in FIG. 5. Block 402 outputs a transmission fluid specific heat acceptance value for heat exchanger 304 of FIG. 3 that is input to block 404.

Figure 6:
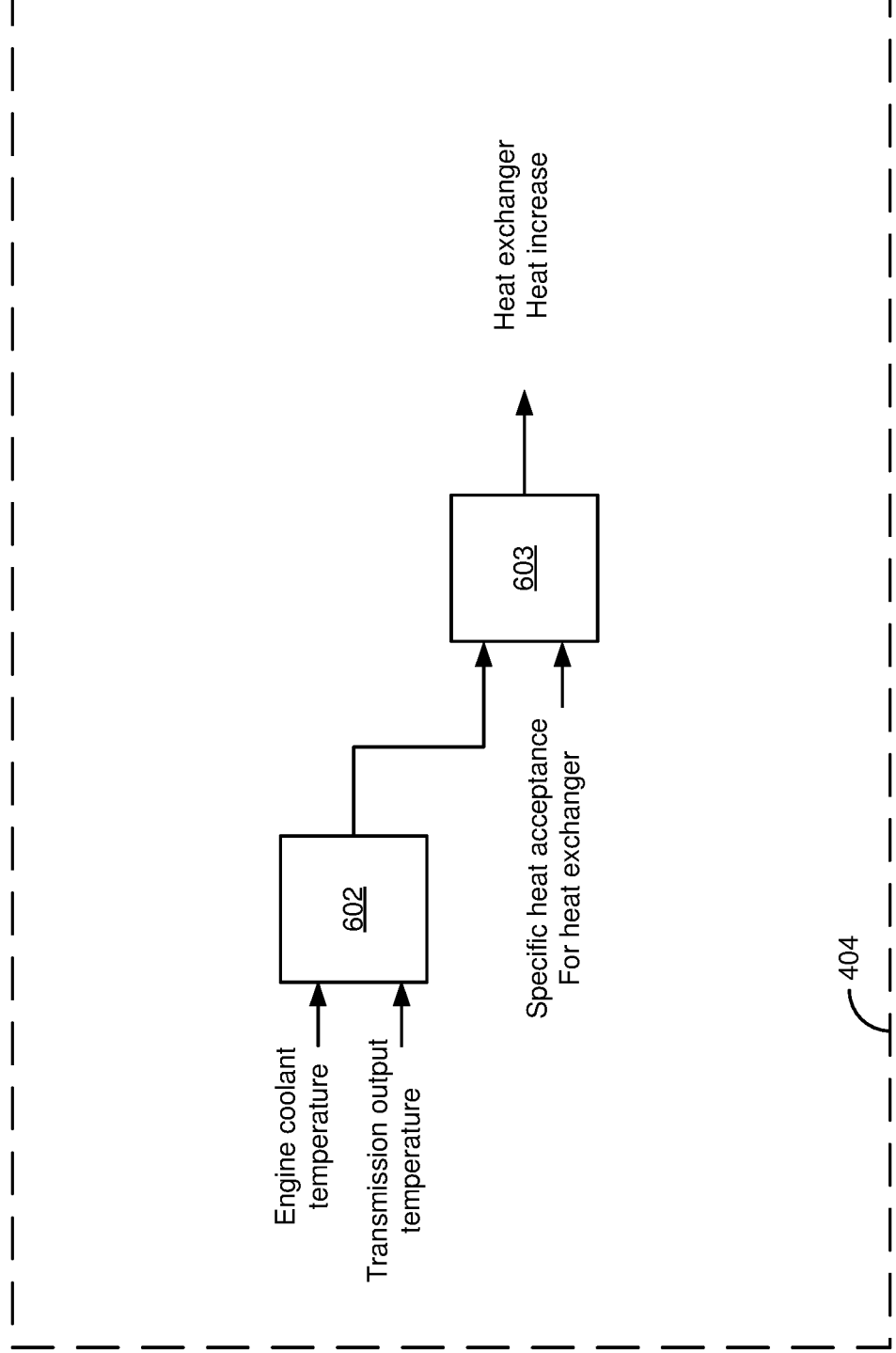

At block 404, engine coolant temperature, transmission output temperature (e.g., transmission fluid temperature at temperature sensor 314 of FIG. 3), and the transmission fluid specific heat acceptance value for heat exchanger 304 are received as inputs to block 404. The inputs are applied to reference tables or functions as shown in FIG. 6. Block 404 outputs a heat exchanger heat increase value for the transmission fluid that exits the heat exchanger. The heat exchanger heat increase value is input to block 406.

Figure 7:
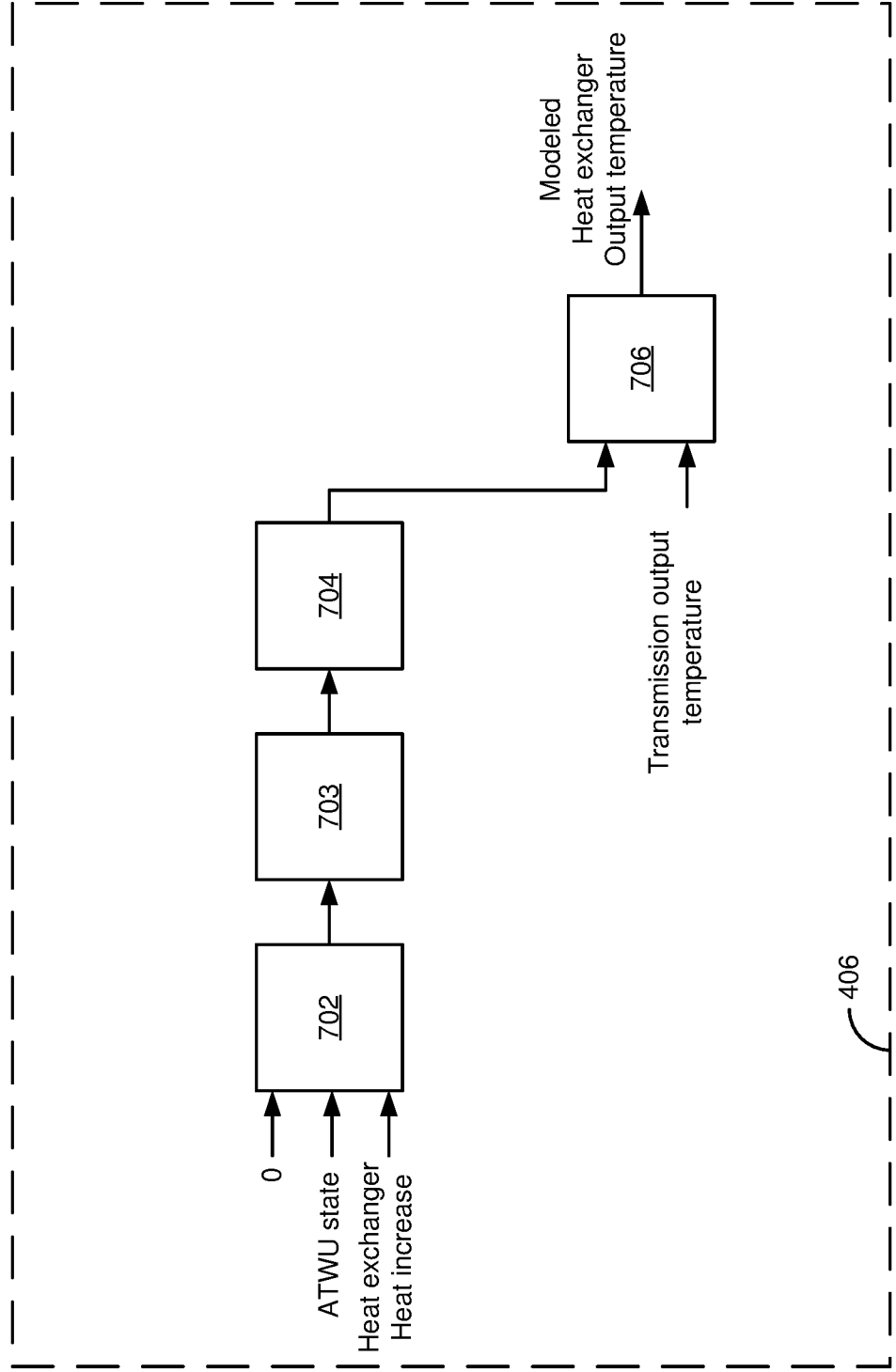

At block 406, a heat exchanger heat increase value for the transmission fluid that exits the heat exchanger, transmission output temperature, and the commanded automatic transmission warm-up (ATWU) valve operating state are received as inputs to block 406. The inputs are applied to reference tables or functions as shown in FIG. 7. Block 406 outputs a modeled or estimated transmission fluid temperature at the outlet of the heat exchanger (e.g., an estimate of the temperature that is sensed via temperature sensor 312) that includes compensation for the commanded ATWU state. The modeled or estimated transmission fluid temperature at the outlet of the heat exchanger is input to block 408.

Figure 8:
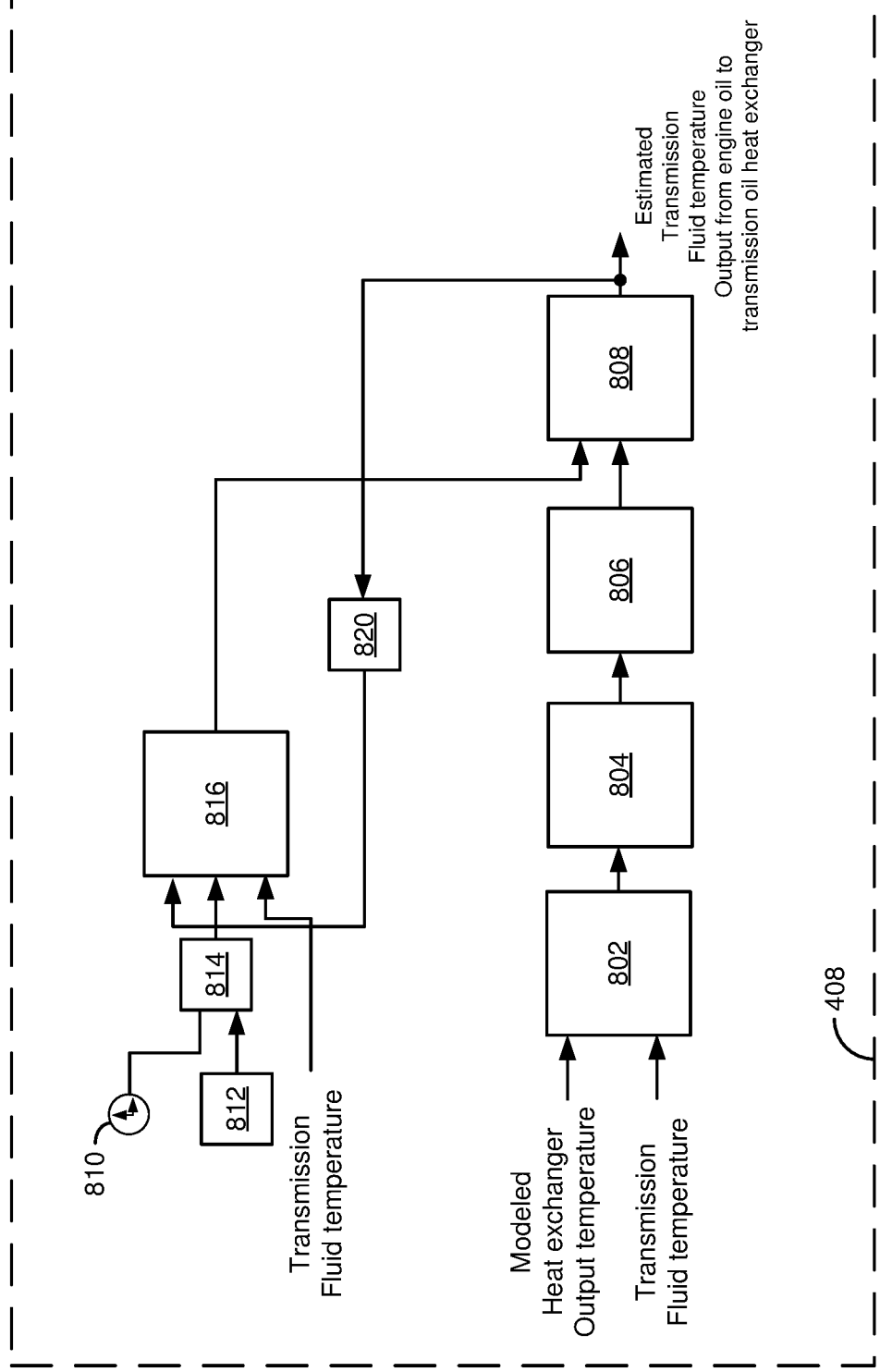

At block 408, modeled or estimated transmission fluid at the outlet of the heat exchanger and actual transmission fluid temperature at the outlet of the heat exchanger are received as inputs to block 408. The inputs are applied to reference tables or functions as shown in FIG. 8. Block 408 outputs a modeled or estimated transmission fluid temperature that is output from the heat exchanger (e.g., an estimate of the temperature that is sensed via temperature sensor 312). The modeled or estimated transmission fluid temperature is input to block 410.

At block 410, modeled or estimated transmission fluid at the outlet of the heat exchanger is compared to the actual transmission fluid temperature at the outlet of the heat exchanger. If the modeled or estimated transmission fluid temperature is greater than the actual transmission fluid temperature by more than a predetermined amount, block 410 indicated automatic transmission warm-up valve degradation. Otherwise, block 410 indicates that the automatic transmission warm-up valve is not degraded. Block 410 outputs an indication as to whether or not the automatic transmission warm-up valve is degraded to block 412.

At block 412, method 400 performs actions to mitigate degradation of the automatic transmission warm-up valve. In particular, method 400 may adjust a human/machine interface to indicate automatic transmission warm-up valve degradation. In addition, method 400 may adjust engine operation in response to automatic transmission warm-up valve degradation. Adjusting engine operation may include adjusting engine spark timing and adjusting engine poppet valve timing so that less engine heat may be rejected to engine coolant during engine cold starting, thereby increasing system efficiency when less engine heat may be transferred to the transmission. For example, spark may be advanced sooner after a cold start if automatic transmission warm-up valve degradation is present. Further, exhaust valve timing may be advanced sooner after a cold engine start if automatic transmission warm-up valve degradation is present.

Method 400 may also adjust transmission operation if automatic transmission warm-up valve degradation is indicated. For example, method 400 may adjust a transmission shift schedule so that transmission clutches may take longer to close. Additionally, adjustments to the torque converter clutch lock-up schedule may be performed when automatic transmission warm-up valve degradation is indicated.

Figure 4:
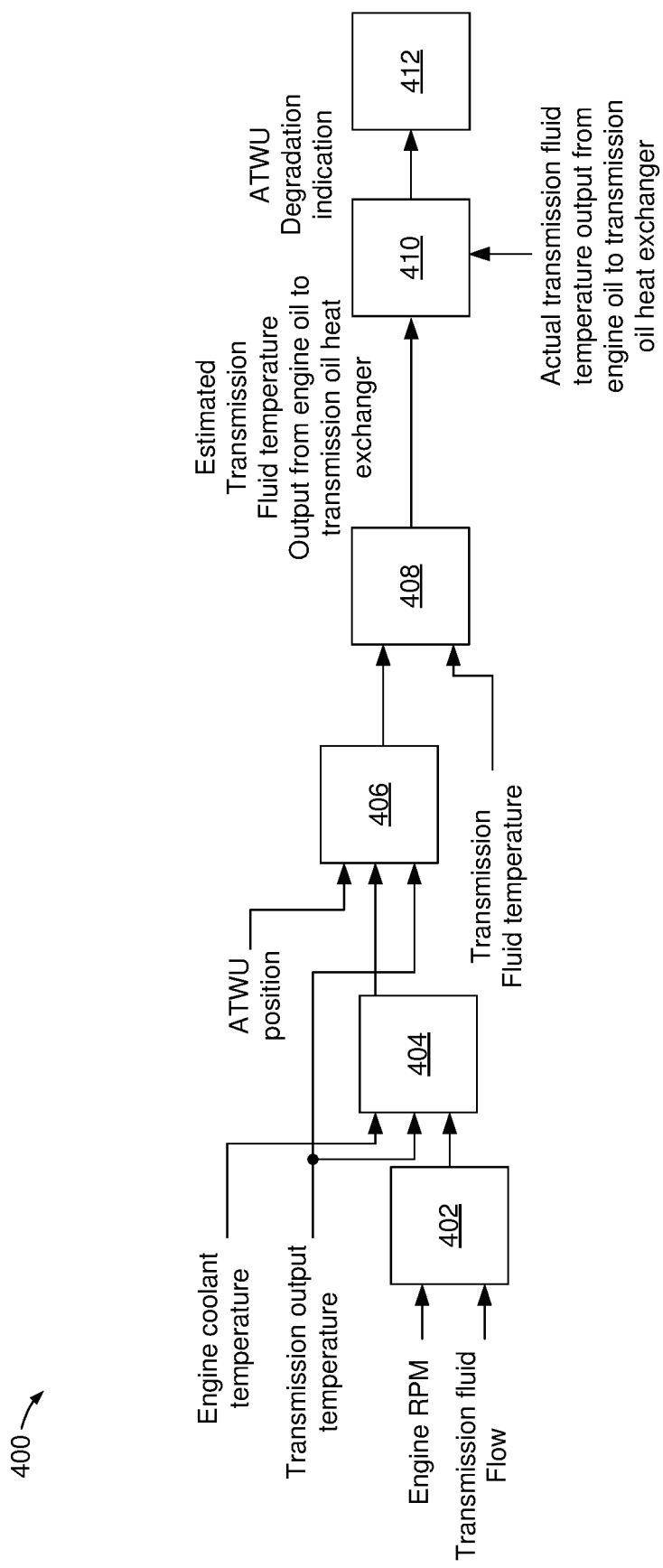
FIGS. 4-9 show block diagrams of a method for diagnosing operation of an automatic transmission warm-up valve.

Thus, the method of FIG. 4 estimates a transmission fluid temperature and compares the estimated transmission fluid temperature to an actual transmission fluid temperature that is determined via a temperature sensor. If the estimated transmission fluid temperature is greater than the actual transmission fluid temperature when the automatic transmission warm-up valve is commanded open, then automatic transmission warm-up valve degradation may be indicated.

Turning now to FIG. 5, a detailed view of the contents of block 402 of FIG. 4 is shown. In particular, engine speed (revolutions/min (RPM)) is input to block 502. Block 502 represents a one dimensional table that outputs an engine coolant flow rate through the heat exchanger when the automatic transmission warm-up valve is fully open according to the engine speed input. The engine coolant flow rate is input into block 503.

Block 503 represents a two dimensional table that outputs a transmission fluid specific heat acceptance value for the heat exchanger. The values in the table are referenced by the engine coolant flow rate and the transmission fluid flow rate through the heat exchanger. The transmission fluid specific heat acceptance value is output from block 402 and it has units of kiloWatts/engine coolant inlet temperature difference with respect to the engine coolant output temperature.

In this way, the operational characteristics of the heat exchanger are used to estimate the transmission fluid temperature. By applying the operational characteristics of the heat exchanger to estimate transmission fluid temperature, accuracy of the estimated transmission fluid temperature may be increased.

Referring now to FIG. 6, a detailed view of the contents of block 404 of FIG. 4 is shown. Specifically, engine coolant temperature, transmission output temperature (e.g., temperature of transmission fluid at the location of temperature sensor 314 of FIG. 4), and transmission fluid specific heat acceptance values for the heat exchanger are received to block 404. The engine coolant temperature and the transmission output temperature are input to block 602. Block 602 represents an arithmetic block where engine coolant temperature is subtracted from the transmission output temperature. The result from block 602 is input to block 603 along with the transmission fluid specific heat acceptance values for the heat exchanger. Block 603 is a multiplication block that multiplies the result output from block 602 by the transmission fluid specific heat acceptance values for the heat exchanger. Block 603 outputs the result of a heat exchanger heat or temperature increase.

Moving on to FIG. 7, a detailed view of the contents of block 406 of FIG. 4 is shown. Block 406 receives a constant (0), an operating state (e.g., open/closed) for the automatic transmission warm-up (ATWU) valve, and the heat exchanger heat or temperature increase. In this example, block 702 is a switching block that outputs the value of one input (0) or the value of a second input (heat exchanger heat increase) to block 703 depending on the operating state of the automatic transmission warm-up valve. If the automatic transmission warm-up valve is closed, block 702 outputs a value of zero. If the automatic transmission warm-up valve is open, block 702 outputs the heat exchanger heat increase value. Block 703 applies a first order low pass filter to values that are input to block 703 and block 703 outputs a filtered value to block 704. Block 704 multiplies the output of block 703 by a scalar value and outputs the result to block 706. At block 706, the transmission output temperature is added to the output of block 704 to generate a modeled transmission output fluid temperature.

Referring now to FIG. 8, a detailed view of the contents of block 408 of FIG. 4 is shown. Block 408 receives modeled heat exchanger output transmission fluid temperature and actual transmission fluid temperature as inputs to block 802. Block 802 is an arithmetic block that subtracts actual transmission fluid temperature from modeled heat exchanger output transmission fluid temperature and it outputs the result to block 804. Block 804 applies a first order low pass filter to the output of block 802 and the result is delivered to block 806 where it is multiplied by a scalar value and the result is supplied to block 808. Block 808 is another arithmetic block and it adds the output of block 816 to the output of block 806 and the result is an estimated transmission fluid temperature output from the heat exchanger (e.g., 304 of FIG. 3).

A system clock 810 and a constant are input to block 814. Block 812 represents the scalar constant value and block 814 represents a greater than block that compares the output of the system clock 810 to the scalar value that is output from block 812. If the output of system clock 801 is greater than the output of block 812, block 814 outputs a value of logical one. Otherwise, block 814 outputs a value of logical zero. Block 816 is a switching block that outputs the value corresponding to the output of block 820 or the value of a second input (transmission fluid temperature) to block 808 depending on the output of block 814. If the output of block 814 is a logical zero, block 816 outputs the output of block 820. If the output of block 814 is a logical one, block 816 outputs the transmission fluid temperature value. Block 820 is a time delay block with an output that is delayed by one time step and the output of block 808 is supplied to the input of block 820.

Figure 9:
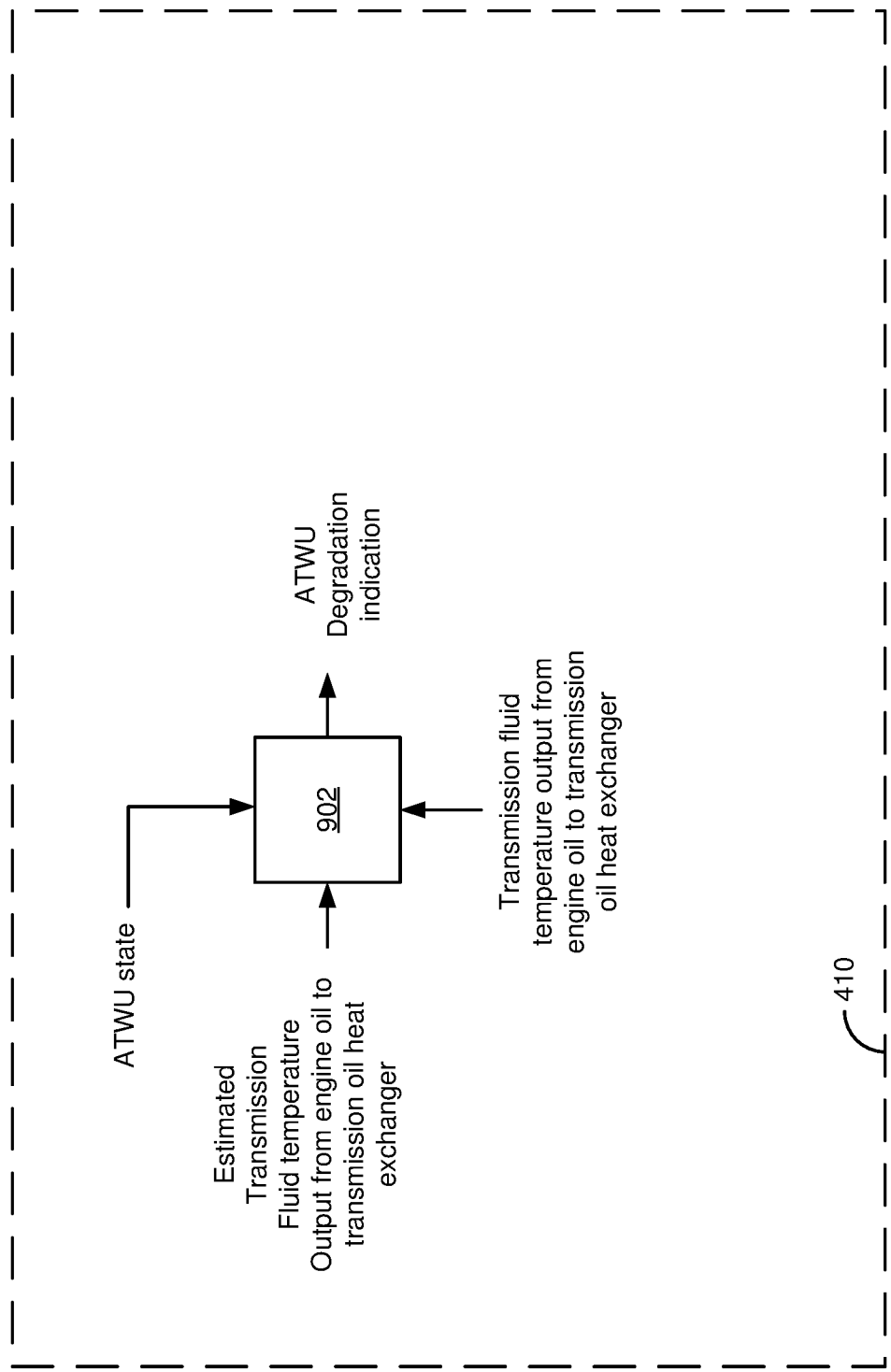
Figure 10:
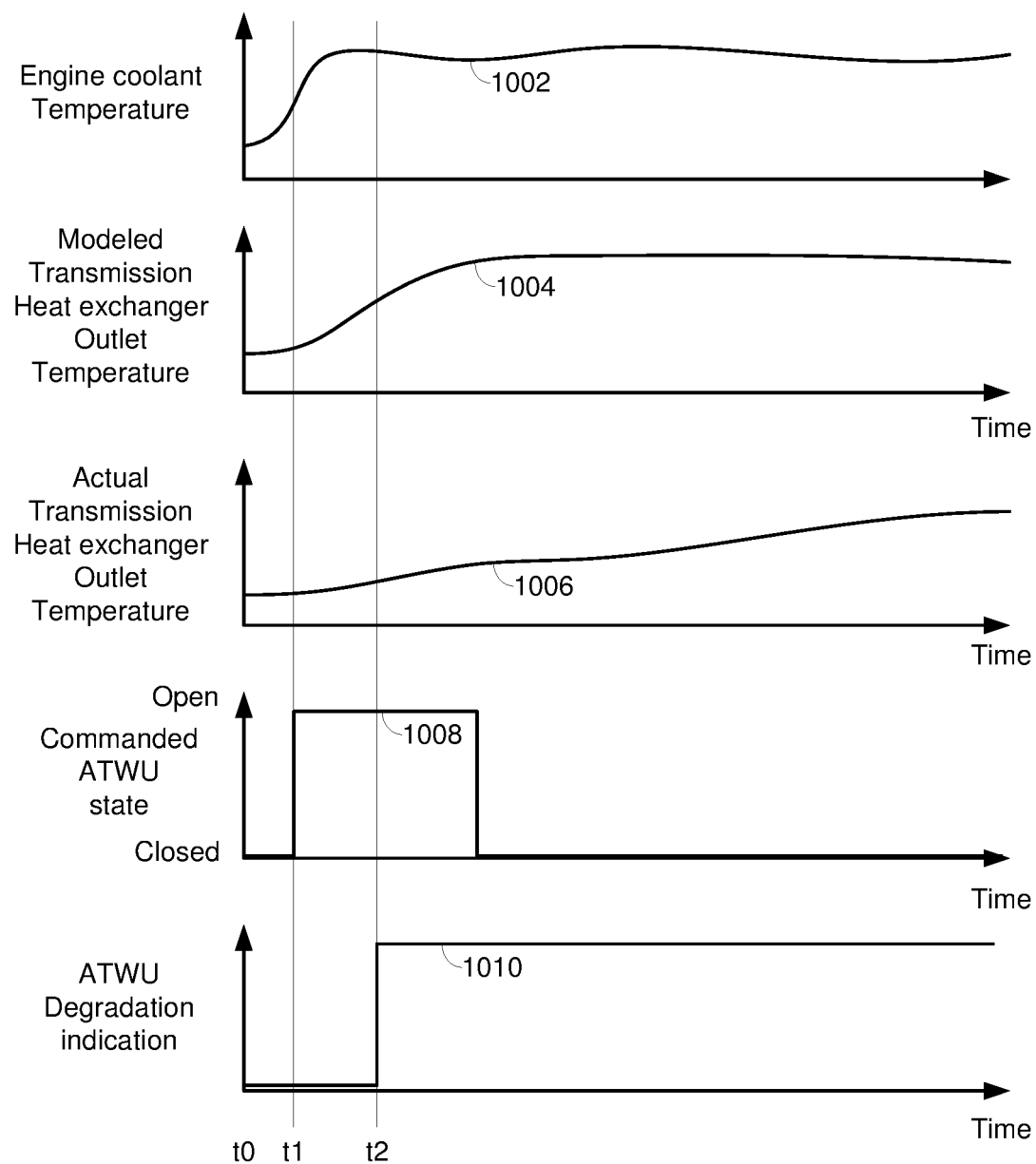
FIG. 10 shows an example vehicle operating sequence according to the method of FIGS. 4-9.

Turning now to FIG. 9, a detailed view of the contents of block 410 of FIG. 4 are shown. Block 410 receives an estimated transmission fluid temperature at the output of the heat exchanger, commanded automatic transmission warm-up valve state, and actual transmission fluid temperature at the output of the heat exchanger. If the estimated transmission fluid temperature at the output of the heat exchanger is greater than the actual transmission fluid temperature at the output of the heat exchanger by more than a predetermined temperature amount and the automatic transmission warm-up valve is commanded open, block 902 outputs a logical one to indicate automatic transmission warm-up valve degradation. If the estimated transmission fluid temperature at the output of the heat exchanger is not greater than the actual transmission fluid temperature at the output of the heat exchanger by more than a predetermined temperature amount and the automatic transmission warm-up valve is commanded open, block 902 outputs a logical zero to indicate no automatic transmission warm-up valve degradation. If the estimated transmission fluid temperature at the output of the heat exchanger is greater than the actual transmission fluid temperature at the output of the heat exchanger by more than a predetermined temperature amount and the automatic transmission warm-up valve is not commanded open, block 902 outputs a logical zero to indicate no automatic transmission warm-up valve degradation. If the estimated transmission fluid temperature at the output of the heat exchanger is not greater than the actual transmission fluid temperature at the output of the heat exchanger by more than a predetermined temperature amount and the automatic transmission warm-up valve is commanded open, block 902 outputs a logical zero to indicate no automatic transmission warm-up valve degradation.

In this way, the method of block diagrams 4-9 may determine whether or not an automatic transmission warm-up valve is degraded or not degraded. The determination of degraded or not degraded may be based on a commanded position of the automatic transmission warm-up valve and an estimated transmission fluid temperature.

The method of FIGS. 4-9 provides for a method for diagnosing operation of a transmission warm-up valve, comprising: via a controller, estimating a temperature of transmission fluid exiting a heat exchanger; and adjusting operation of a device in response to a difference between the temperature and an actual temperature of transmission fluid exiting the heat exchanger via the controller. In a first example, the method includes where estimating the temperature of transmission fluid includes adjusting the temperature in response to a specific heat acceptance value of the heat exchanger. In a second example that may include the first example, the method includes where the specific heat acceptance value is a function of a flow rate of engine coolant through the heat exchanger. In a third example that may include one or both of the first and second examples, the method includes where the specific heat acceptance value is also based on a flow rate of transmission fluid through the heat exchanger. In a fourth example that may include one or more of the first through third examples, the method includes where the device is a transmission. In a fifth example that may include one or more of the first through fourth examples, the method includes where the device is an engine. In a sixth example that may include one or more of the first through fifth examples, the method includes where the device is a human/machine interface. In a seventh example that may include one or more of the first through sixth examples, the method includes where the temperature is estimated based on a commanded position of the transmission warm-up valve.

The method of FIGS. 4-9 also provides for a method for diagnosing operation of a transmission warm-up valve, comprising: via a controller, commanding the transmission warm-up valve to a predetermined state; and judging whether or not the transmission warm-up valve is in the predetermined state in response to an estimated temperature of transmission fluid exiting a heat exchanger. In a first example, the method includes where the estimated temperature of the transmission fluid is compared to an actual temperature of the transmission fluid. In a second example that may include the first example, the method includes where the transmission warm-up valve is determined to be degraded when the estimated temperature of the transmission fluid exceeds the actual temperature of the transmission fluid by a predetermined temperature. In a third example that may include one or both of the first and second examples, the method further comprises adjusting operation of a transmission or an engine in response to whether or not the transmission warm-up is judged to be in the predetermined state. In a fourth example that may include one or more of the first through third examples, the method includes where the predetermined state is an open state.

Referring now to FIG. 10, an example vehicle operating sequence according to the method of FIGS. 4-9 is shown. The operating sequence of FIG. 10 may be generated via the system of FIGS. 1-3 in cooperation with the method of FIGS. 4-9. The plots of FIG. 10 are time aligned and the vertical lines indicate times of interest in the sequence.

The first plot from the top of FIG. 10 is a plot of engine coolant temperature versus time. The vertical axis represents the engine coolant temperature and the engine coolant temperature increases in the direction of the vertical axis arrow. The horizontal axis represents time and the amount of time increases from the left side of the plot to the right side of the plot. Trace 1002 represents the engine coolant temperature.

The second plot from the top of FIG. 10 is a plot of engine coolant temperature versus time. The vertical axis represents the engine coolant temperature and the engine coolant temperature increases in the direction of the vertical axis arrow. The horizontal axis represents time and the amount of time increases from the left side of the plot to the right side of the plot. Trace 1004 represents the engine coolant temperature.

The third plot from the top of FIG. 10 is a plot of estimated or modeled transmission fluid temperature at an outlet of an engine coolant to transmission fluid heat exchanger. The vertical axis represents estimated or modeled transmission fluid temperature at the outlet of the engine coolant to transmission fluid heat exchanger and the estimated or modeled transmission fluid temperature increases in the direction of the vertical axis arrow. The horizontal axis represents time and the amount of time increases from the left side of the plot to the right side of the plot. Trace 1006 represents the estimated or modeled transmission fluid temperature at the outlet of the engine coolant to transmission fluid heat exchanger.

The fourth plot from the top of FIG. 10 is a plot of commanded automatic transmission warm-up valve operating state versus time. The vertical axis represents commanded automatic transmission warm-up valve operating state and the automatic transmission warm-up valve is commanded open when trace 1008 is near the vertical axis arrow. The automatic transmission warm-up valve is commanded closed when trace 1008 is near the horizontal axis. The horizontal axis represents time and the amount of time increases from the left side of the plot to the right side of the plot. Trace 1008 represents the commanded automatic transmission warm-up valve state.

The fifth plot from the top of FIG. 10 is a plot of automatic transmission warm-up valve degradation state versus time. The vertical axis represents automatic transmission warm-up valve degradation state and the automatic warm-up valve is determined to be degraded when trace 1010 is near the vertical axis arrow. The automatic transmission warm-up valve is determined not degraded when trace 1010 is near the horizontal axis. The horizontal axis represents time and the amount of time increases from the left side of the plot to the right side of the plot. Trace 1010 represents the automatic transmission warm-up valve degradation state.

At time t0, the engine is cold started and engine coolant temperature begins to rise. The automatic transmission warm-up valve is fully closed to allow the engine to heat faster than if the automatic transmission warm-up valve were open so that engine emissions may be reduced. The modeled transmission fluid temperature and the actual transmission fluid temperatures begin to gradually increase since the engine is rotating the torque converter, which begins to heat the transmission fluid. The automatic transmission warm-up valve is not indicated as being degraded.

At time t1, the engine coolant temperature reaches a threshold temperature, thereby causing the controller to command the automatic transmission warm-up valve fully open. The modeled or estimated transmission fluid temperature at the outlet of the engine coolant to transmission fluid heat exchanger begins to increase at a faster rate. The automatic transmission warm-up valve remains commanded fully open and it is not indicated as being degraded.

At time t2, the engine coolant temperature has leveled off and the modeled transmission fluid temperature at the outlet of the engine coolant to transmission fluid heat exchanger has increased much faster than the actual transmission fluid temperature, which causes the automatic transmission warm-up valve to be determined to be degraded. The automatic transmission warm-up valve remains commanded fully open, but the automatic transmission warm-up valve is indicated as being degraded because the actual temperature of transmission fluid is significantly less than the estimated or modeled automatic transmission fluid temperature, which may indicate that the valve has not opened.

In this way, an automatic transmission warm-up valve may be diagnosed as not being degraded or being degraded. The determination may be based on commanded valve state and temperature of transmission fluid exiting an engine coolant to transmission fluid heat exchanger.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for diagnosing operation of a transmission warm-up valve, comprising:
   via a controller, estimating a temperature of transmission fluid exiting a heat exchanger; and
   adjusting operation of a device in response to a difference between the temperature and an actual temperature of transmission fluid exiting the heat exchanger via the controller.

2. The method of claim 1, where estimating the temperature of transmission fluid includes adjusting the temperature in response to a specific heat acceptance value of the heat exchanger.

3. The method of claim 2, where the specific heat acceptance value is a function of an engine coolant flow rate through the heat exchanger.

4. The method of claim 3, where the specific heat acceptance value is also based on a transmission fluid flow rate through the heat exchanger.

5. The method of claim 2, where the device is a transmission.

6. The method of claim 2, where the device is an engine.

7. The method of claim 2, where the device is a human/machine interface.

8. The method of claim 1, where the temperature is estimated based on a commanded position of the transmission warm-up valve.

9. A transmission warming system, comprising:
   an internal combustion engine;
   an automatic transmission;
   a heat exchanger;
   an automatic transmission warm-up valve; and
   a controller including executable instructions stored in non-transitory memory that cause the controller to generate a comparison of an estimate of a temperature of transmission fluid exiting the heat exchanger to an actual temperature of transmission fluid exiting the heat exchanger, and adjust operation of the automatic transmission or the internal combustion engine in response to the comparison.

10. The transmission warming system of claim 9, where the estimate of the temperature of the transmission fluid is based on a commanded state of the automatic transmission warm-up valve.

11. The transmission warming system of claim 10, where the estimate of the temperature of the transmission fluid is also based on a specific heat acceptance value of the heat exchanger.

12. The transmission warming system of claim 11, where the estimate of the temperature of the transmission fluid is further based on engine coolant temperature.

13. The transmission warming system of claim 12, where the estimate of the temperature of the transmission fluid is further based on engine speed.

14. The transmission warming system of claim 9, where adjusting operating of the automatic transmission includes modifying a transmission shift schedule.

15. The transmission warming system of claim 9, where adjusting operation of the internal combustion engine includes adjusting engine valve timing.

16. A method for diagnosing operation of an automatic transmission warm-up valve, comprising:
   via a controller, commanding the automatic transmission warm-up valve to a predetermined state; and
   judging whether or not the automatic transmission warm-up valve is in the predetermined state in response to an estimated temperature of transmission fluid exiting a heat exchanger.

17. The method of claim 16, where the estimated temperature of the transmission fluid is compared to an actual temperature of the transmission fluid.

18. The method of claim 17, where the automatic transmission warm-up valve is determined to be degraded when the estimated temperature of the transmission fluid exceeds the actual temperature of the transmission fluid by a predetermined temperature.

19. The method of claim 16, further comprising adjusting operation of a transmission or an engine in response to whether or not the automatic transmission warm-up valve is judged to be in the predetermined state.

20. The method of claim 19, where the predetermined state is an open state.

* * * * *